US010977361B2

(12) United States Patent
Kolishchak (10) Patent No.: US 10,977,361 B2
(45) Date of Patent: Apr. 13, 2021

(54) SYSTEMS AND METHODS FOR CONTROLLING PRIVILEGED OPERATIONS

(71) Applicant: BeyondTrust Software, Inc., Phoenix, AZ (US)

(72) Inventor: Andrey Kolishchak, Andover, MA (US)

( * ) Notice: Subject to any disclaimer, the term of this patent is extended or adjusted under 35 U.S.C. 154(b) by 304 days.

(21) Appl. No.: 15/596,420

(22) Filed: May 16, 2017

(65) Prior Publication Data

US 2018/0336360 A1 Nov. 22, 2018

(51) Int. Cl.
| | | |
|---|---|---|
| *G06F 17/00* | (2019.01) | |
| *H04L 29/06* | (2006.01) | |
| *G06F 21/53* | (2013.01) | |
| *G06F 21/60* | (2013.01) | |
| *G06F 21/62* | (2013.01) | |

(52) U.S. Cl.
CPC ............ *G06F 21/53* (2013.01); *G06F 21/604* (2013.01); *G06F 21/6281* (2013.01)

(58) Field of Classification Search
None
See application file for complete search history.

(56) References Cited

U.S. PATENT DOCUMENTS

| 4,959,861 A | 9/1990 | Howlette |
| 5,535,383 A | 7/1996 | Gower |
| 5,553,143 A | 9/1996 | Ross et al. |
| 5,579,222 A | 11/1996 | Bains et al. |
| 5,655,081 A | 8/1997 | Bonnell et al. |

(Continued)

FOREIGN PATENT DOCUMENTS

| JP | 2007010666 | 1/2007 |
| WO | 2007005638 | 6/2006 |

(Continued)

OTHER PUBLICATIONS

International Search Report and Written Opinion dated Apr. 17, 2014 for International PCT Pat. Appl. No. PCT/US2014/011729.

(Continued)

*Primary Examiner* — Jeffrey Nickerson
*Assistant Examiner* — Vadim Savenkov
(74) *Attorney, Agent, or Firm* — Morris, Manning & Martin, LLP; Daniel E. Sineway; Adam J. Thompson (57) ABSTRACT

Systems and methods for controlling privileged operations. The system and method may comprise the steps of: providing a kernel module having a kernel authorization subsystem, the kernel module being loadable to a client computer system and configured to intercept file operations, wherein the kernel authorization subsystem may manage authorization of the one or more file operations; registering a listener for the kernel authorization subsystem; monitoring the file operations for a file access, and calling the registered listener by the kernel authorization subsystem when the kernel authorization subsystem detects the file access; calling a privileged daemon by the kernel module, when identifying the file access; and checking a policy, by the privileged daemon, and determining, based on the policy, whether at least one applied rule is applicable. If the at least one applied rule is applicable, the privileged daemon may initialize a launcher module, which may launch the target application.

20 Claims, 5 Drawing Sheets

(56) References Cited

U.S. PATENT DOCUMENTS

| | | |
|---|---|---|
| 5,671,412 A | 9/1997 | Christiano |
| 5,689,638 A | 11/1997 | Sadovsky |
| 5,719,941 A | 2/1998 | Swift et al. |
| 5,737,600 A | 4/1998 | Geiner et al. |
| 5,742,757 A | 4/1998 | Hamandani et al. |
| 5,754,763 A | 5/1998 | Bereiter |
| 5,793,952 A | 8/1998 | Limsico |
| 5,862,260 A | 1/1999 | Rhoads |
| 5,944,825 A | 8/1999 | Bellemore et al. |
| 5,978,594 A | 11/1999 | Bonnell et al. |
| 6,026,397 A | 2/2000 | Sheppard |
| 6,029,145 A | 2/2000 | Barritz et al. |
| 6,105,027 A | 8/2000 | Schneider et al. |
| 6,182,212 B1 | 1/2001 | Atkins et al. |
| 6,237,144 B1 | 5/2001 | Delo |
| 6,282,653 B1 | 8/2001 | Berstis et al. |
| 6,289,341 B1 | 9/2001 | Barney |
| 6,308,274 B1 | 10/2001 | Swift |
| 6,345,386 B1 | 2/2002 | Delo et al. |
| 6,363,391 B1 | 3/2002 | Rosensteel, Jr. |
| 6,363,499 B1 | 5/2002 | Frank, Jr. et al. |
| 6,389,589 B1 | 5/2002 | Mishra et al. |
| 6,397,381 B1 | 5/2002 | Delo et al. |
| 6,405,318 B1 | 6/2002 | Rowland |
| 6,408,336 B1 | 6/2002 | Schneider et al. |
| 6,412,070 B1 | 6/2002 | Van Dyke et al. |
| 6,418,554 B1 | 7/2002 | Delo et al. |
| 6,434,535 B1 | 8/2002 | Kupka et al. |
| 6,446,077 B2 | 9/2002 | Straube et al. |
| 6,446,211 B1 | 9/2002 | Colvin |
| 6,460,142 B1 | 10/2002 | Colvin |
| 6,466,932 B1 | 10/2002 | Dennis et al. |
| 6,484,264 B1 | 11/2002 | Colvin |
| 6,502,195 B1 | 12/2002 | Colvin |
| 6,566,081 B1 | 5/2003 | Bonnell et al. |
| 6,591,228 B1 | 7/2003 | Hall et al. |
| 6,684,259 B1 | 1/2004 | Discavage |
| 6,769,074 B2 | 7/2004 | Vaitzblit |
| 6,817,017 B2 | 11/2004 | Goodman |
| 6,836,794 B1 | 12/2004 | Lucovsky et al. |
| 6,857,067 B2 | 2/2005 | Edelman |
| 6,915,287 B1 | 7/2005 | Felsted et al. |
| 6,920,567 B1 | 7/2005 | Doherty et al. |
| 6,950,818 B2 | 9/2005 | Dennis et al. |
| 6,954,738 B2 | 10/2005 | Wang et al. |
| 6,963,981 B1 | 11/2005 | Bailey et al. |
| 6,978,379 B1 | 12/2005 | Goh et al. |
| 6,983,317 B1 | 1/2006 | Bishop et al. |
| 7,000,118 B1 | 2/2006 | Murthy et al. |
| 7,028,079 B2 | 4/2006 | Mastrianni et al. |
| 7,035,910 B1 | 4/2006 | Dutta et al. |
| 7,146,638 B2 | 12/2006 | Malcolm |
| 7,162,649 B1 | 1/2007 | Ide et al. |
| 7,272,625 B1 | 7/2007 | Hannel et al. |
| 7,284,043 B2 | 10/2007 | Feinleib et al. |
| 7,321,300 B2 | 1/2008 | Friedrich et al. |
| 7,330,712 B2 | 2/2008 | Kirkup et al. |
| 7,350,204 B2 | 3/2008 | Lambert et al. |
| 7,367,057 B2* | 4/2008 | Das .................. G06F 21/566 |
| | | 712/208 |
| 7,398,532 B1 | 7/2008 | Barber et al. |
| 7,461,398 B2 | 12/2008 | Aaron |
| 7,472,420 B1 | 12/2008 | Pavlyushchik |
| 7,506,038 B1 | 3/2009 | Perrone et al. |
| 7,673,323 B1 | 3/2010 | Moriconi |
| 7,783,673 B2 | 8/2010 | Schneider et al. |
| 7,784,101 B2 | 8/2010 | Verbowski et al. |
| 7,797,752 B1 | 9/2010 | Vaidya et al. |
| 7,845,009 B2* | 11/2010 | Grobman ............ G06F 21/53 |
| | | 718/1 |
| 7,904,479 B2 | 3/2011 | Zuk |
| 7,950,051 B1 | 5/2011 | Spitz et al. |
| 7,962,709 B2 | 6/2011 | Agrawal |
| 8,006,088 B2 | 8/2011 | Peretti |
| RE42,762 E | 9/2011 | Shin |
| 8,127,316 B1 | 2/2012 | Binotto et al. |
| 8,205,239 B1 | 6/2012 | Satish |
| 8,286,241 B1 | 10/2012 | Yeo |
| 8,346,626 B2 | 1/2013 | Robertson |
| 8,453,244 B2 | 5/2013 | Dai et al. |
| 8,543,683 B2 | 9/2013 | Kiciman et al. |
| 8,560,661 B2 | 10/2013 | Nazarov |
| 8,621,607 B2* | 12/2013 | Pike ..................... G06F 21/52 |
| | | 709/203 |
| 8,621,647 B1* | 12/2013 | Tinnes ................. G06F 21/57 |
| | | 726/27 |
| 8,655,307 B1 | 2/2014 | Walker et al. |
| 8,719,190 B2 | 5/2014 | El-Rafei et al. |
| 8,738,906 B1 | 5/2014 | Sampath et al. |
| 8,752,201 B2* | 6/2014 | Lee ..................... G06F 21/10 |
| | | 726/28 |
| 8,776,168 B1 | 7/2014 | Gibson et al. |
| 8,806,494 B2 | 8/2014 | Russinovich et al. |
| 8,955,119 B2 | 2/2015 | Zhao |
| 9,197,660 B2 | 11/2015 | Sun et al. |
| 9,208,338 B2 | 12/2015 | Patidar et al. |
| 2001/0011254 A1 | 8/2001 | Clark |
| 2001/0041989 A1 | 11/2001 | Vilcauskas et al. |
| 2001/0049796 A1 | 12/2001 | Roth et al. |
| 2002/0007363 A1 | 1/2002 | Vaitzblit |
| 2002/0010867 A1 | 1/2002 | Shcaefer et al. |
| 2002/0165724 A1 | 1/2002 | Blankesteijn |
| 2002/0026591 A1 | 2/2002 | Hartley et al. |
| 2002/0091645 A1 | 7/2002 | Tohyama |
| 2002/0095671 A1 | 7/2002 | Delo et al. |
| 2002/0112186 A1 | 8/2002 | Ford et al. |
| 2002/0129277 A1 | 9/2002 | Caccavale |
| 2002/0166052 A1 | 11/2002 | Garg et al. |
| 2002/0169747 A1 | 11/2002 | Chapman et al. |
| 2002/0178233 A1 | 11/2002 | Mastrianni et al. |
| 2003/0023587 A1 | 1/2003 | Dennis et al. |
| 2003/0023874 A1 | 1/2003 | Prokupets et al. |
| 2003/0033535 A1 | 2/2003 | Fisher et al. |
| 2003/0140043 A1 | 7/2003 | Hotchkiss et al. |
| 2003/0145317 A1 | 7/2003 | Chamberlain et al. |
| 2003/0159055 A1 | 8/2003 | Robbins |
| 2003/0172291 A1 | 9/2003 | Judge et al. |
| 2003/0177074 A1 | 9/2003 | Ramanathan |
| 2003/0191868 A1 | 10/2003 | Espino |
| 2003/0233581 A1 | 12/2003 | Reshef et al. |
| 2004/0090930 A1 | 5/2004 | Lee et al. |
| 2004/0098610 A1 | 5/2004 | Hrastar |
| 2004/0107368 A1 | 6/2004 | Colvin |
| 2004/0117628 A1 | 6/2004 | Colvin |
| 2004/0117631 A1 | 6/2004 | Colvin |
| 2004/0117644 A1 | 6/2004 | Colvin |
| 2004/0117663 A1 | 6/2004 | Colvin |
| 2004/0117664 A1 | 6/2004 | Colvin |
| 2004/0128551 A1 | 7/2004 | Walker |
| 2004/0153658 A1 | 8/2004 | Gunyakti et al. |
| 2004/0162880 A1 | 8/2004 | Arnone et al. |
| 2004/0168090 A1 | 8/2004 | Chawla et al. |
| 2004/0199609 A1 | 10/2004 | Papatla et al. |
| 2004/0215650 A1 | 10/2004 | Shaji et al. |
| 2004/0230623 A1 | 11/2004 | D'Angelo et al. |
| 2004/0239946 A1 | 12/2004 | Kane et al. |
| 2005/0015623 A1 | 1/2005 | Williams |
| 2005/0021497 A1 | 1/2005 | Kanai |
| 2005/0068901 A1 | 3/2005 | Nurminen |
| 2005/0110965 A1 | 5/2005 | Hendriks et al. |
| 2005/0182969 A1 | 8/2005 | Ginter et al. |
| 2005/0203881 A1 | 9/2005 | Sakamoto et al. |
| 2005/0262503 A1 | 11/2005 | Kane et al. |
| 2005/0273399 A1 | 12/2005 | Soma et al. |
| 2006/0026195 A1 | 2/2006 | Gu et al. |
| 2006/0026679 A1 | 2/2006 | Zakas |
| 2006/0047929 A1 | 3/2006 | Jezierski |
| 2006/0064474 A1 | 3/2006 | Feinleib et al. |
| 2006/0095768 A1 | 5/2006 | Hoshino |
| 2006/0165060 A1 | 7/2006 | Dua |
| 2006/0174323 A1 | 8/2006 | Brown |
| 2006/0221077 A1 | 10/2006 | Wright |
| 2006/0248585 A1 | 11/2006 | Ward et al. |
| 2006/0271789 A1 | 11/2006 | Satomura |

(56) References Cited

U.S. PATENT DOCUMENTS

| | | |
|---|---|---|
| 2007/0013921 A1 | 1/2007 | Pellemans et al. |
| 2007/0028303 A1 | 2/2007 | Brennan |
| 2007/0043943 A1 | 2/2007 | Peretti |
| 2007/0057763 A1 | 3/2007 | Blattner et al. |
| 2007/0067833 A1 | 3/2007 | Colnot |
| 2007/0094735 A1 | 4/2007 | Cohen et al. |
| 2007/0169199 A1 | 7/2007 | Quinnell et al. |
| 2007/0174824 A1 | 7/2007 | Relyea et al. |
| 2007/0180509 A1 | 8/2007 | Swartz et al. |
| 2007/0199068 A1 | 8/2007 | Russinovich |
| 2007/0255957 A1 | 11/2007 | Arnone et al. |
| 2008/0015448 A1 | 1/2008 | Keely et al. |
| 2008/0040606 A1 | 2/2008 | Narayanan et al. |
| 2008/0040797 A1 | 2/2008 | Schwartz |
| 2008/0056560 A1 | 3/2008 | Yu et al. |
| 2008/0109871 A1 | 5/2008 | Jacobs |
| 2008/0148342 A1 | 6/2008 | Aiyagari et al. |
| 2008/0168545 A1 | 7/2008 | Inoue et al. |
| 2008/0172743 A1 | 7/2008 | Aaron |
| 2008/0313171 A1 | 12/2008 | Galvin |
| 2009/0097008 A1 | 4/2009 | Mos et al. |
| 2009/0106556 A1 | 4/2009 | Hamid |
| 2009/0150989 A1 | 6/2009 | Hoey et al. |
| 2009/0271840 A1* | 10/2009 | Gillet ................. G06F 21/6209 726/1 |
| 2009/0271863 A1 | 10/2009 | Govindavajhala et al. |
| 2009/0300057 A1 | 12/2009 | Friedman |
| 2010/0023754 A1 | 1/2010 | Peled et al. |
| 2010/0031360 A1* | 2/2010 | Seshadri ................. G06F 21/57 726/24 |
| 2010/0100948 A1 | 4/2010 | Delia |
| 2010/0107227 A1 | 4/2010 | Hicks |
| 2010/0111300 A1 | 5/2010 | Kido et al. |
| 2010/0121929 A1 | 5/2010 | Lin |
| 2010/0212010 A1 | 8/2010 | Stringer et al. |
| 2010/0228749 A1 | 9/2010 | Castro et al. |
| 2010/0242082 A1 | 9/2010 | Keene et al. |
| 2010/0251369 A1 | 9/2010 | Grant |
| 2010/0257539 A1 | 10/2010 | Narayanan |
| 2010/0299292 A1 | 11/2010 | Collazo |
| 2010/0306236 A1 | 12/2010 | Cychosz et al. |
| 2010/0313035 A1 | 12/2010 | Honig et al. |
| 2010/0325703 A1 | 12/2010 | Etchegoyen |
| 2010/0325707 A1 | 12/2010 | Iverson et al. |
| 2011/0082845 A1 | 4/2011 | Padala et al. |
| 2011/0179284 A1 | 7/2011 | Suzuki et al. |
| 2011/0209193 A1 | 8/2011 | Kennedy |
| 2011/0239306 A1* | 9/2011 | Avni ................. G06F 21/54 726/26 |
| 2011/0271114 A1 | 11/2011 | Baysinger |
| 2011/0296502 A1 | 12/2011 | Peretti |
| 2012/0017262 A1 | 1/2012 | Kapoor et al. |
| 2012/0047580 A1* | 2/2012 | Smith ................. G06F 21/53 726/24 |
| 2012/0072968 A1 | 3/2012 | Wysopal et al. |
| 2012/0185910 A1 | 7/2012 | Miettinen et al. |
| 2012/0233656 A1 | 9/2012 | Rieschick et al. |
| 2012/0284793 A1 | 11/2012 | Steinbrecher et al. |
| 2012/0311341 A1* | 12/2012 | Paris ................. G06F 21/57 713/179 |
| 2012/0323853 A1 | 12/2012 | Fries et al. |
| 2013/0031633 A1 | 1/2013 | Honig et al. |
| 2013/0061300 A1 | 3/2013 | Novak et al. |
| 2013/0097706 A1 | 4/2013 | Titonis et al. |
| 2013/0246423 A1 | 9/2013 | Bhargava et al. |
| 2013/0347111 A1* | 12/2013 | Karta ................. H04L 63/1441 726/23 |
| 2014/0012851 A1 | 1/2014 | Shmueli |
| 2014/0047544 A1 | 2/2014 | Jakobsson |
| 2014/0157355 A1* | 6/2014 | Clancy, III ................. G06F 21/53 726/1 |
| 2014/0273965 A1 | 9/2014 | Raleigh et al. |
| 2014/0325591 A1 | 10/2014 | Delta et al. |
| 2015/0047025 A1 | 2/2015 | Beauregard et al. |
| 2015/0128274 A1 | 5/2015 | Giokas |
| 2015/0205692 A1 | 7/2015 | Seto |
| 2016/0065594 A1 | 3/2016 | Srivastava |
| 2016/0226904 A1 | 8/2016 | Bartos |
| 2016/0335433 A1* | 11/2016 | Dabosville ............ G06F 21/552 |
| 2017/0244729 A1* | 8/2017 | Fahrny ................. H04L 63/1416 |
| 2017/0353499 A1* | 12/2017 | Huang ................. H04L 63/20 |
| 2018/0046635 A1* | 2/2018 | Nichols ................. G06F 21/6218 |
| 2018/0253315 A1* | 9/2018 | Norton ................. G06F 9/4881 |

FOREIGN PATENT DOCUMENTS

| | | |
|---|---|---|
| WO | 2008049005 | 4/2008 |
| WO | 2012001667 | 1/2012 |

OTHER PUBLICATIONS

International Search Report and Written Opinion dated Jul. 10, 2014 for International PCT Pat. Appl. No. PCT/US2014/016976.

International Search Report and Written Opinion dated Apr. 24, 2017 for International PCT Pat. Appl. No. PCT/US2016/068622.

International Search Report and Written Opinion dated Apr. 11, 2017 for International PCT Pat. Appl. No. PCT/US2016/068623.

International Search Report and Written Opinion dated May 23, 2012 for International PCT Pat. Appl. No. PCT/US2012/024638.

International Search Report and Written Opinion dated Jan. 5, 2017 for International PCT Pat. Appl. No. PCT/US2016/054874.

International Search Report and Written Opinion dated Jan. 18, 2017 for International PCT Pat. Appl. No. PCT/US2016/054839.

\* cited by examiner

SYSTEMS AND METHODS FOR CONTROLLING PRIVILEGED OPERATIONS

FIELD OF USE

The present disclosure relates generally to systems and methods for controlling access to a resource in a computer system, and more particularly, to systems and methods for providing access to one or more resources based on privileged operations selected by a policy configured by a policy editor.

BACKGROUND

In general, a computer system executes a process using various physical and logical resources, such as system services, registry settings, drivers, and files. In doing so, the operating system of the computer system may utilize a security mechanism that enforces the access rights for each process, such that the process is permitted or denied access to each of the resources. The access rights for each process typically must be consistent with a set of security privileges allocated to that process. A process for an administrator, for example, generally has a higher privilege (e.g., reading, writing), whereas, a process for a standard user is generally much lower (e.g., reading only).

For various operating systems, including the Apple® OS X®, the access privileges are based on the type of user account. Specifically, privilege levels may be directed to certain users based on the user's class, and then applied to a particular user logged in (e.g., local administrator, system administrator, standard user). The user is then authenticated by logging in to the computer device via his or her previously prepared security account. The operating system then grants the appropriate privileges to each process thereafter.

To overcome the deficiencies of assigning various access privileges based on the class of the user class, it is generally desirable to implement a security access model, where certain privileged operations are granted to standard unprivileged users. While most software applications require a relatively high privilege level to perform restricted operations (e.g., local administrator), it is generally desirable to provide additional privilege rights to standard users. Such additional privileged operations are also preferably selected by a policy based on a set of rules preconfigured by a policy editor.

Therefore what is needed is needed is a computer-implemented method for controlling privileged operations. Preferably, the computer-implemented method will allow users to control operations for various operating systems, including a Linux® or Mac® OS X® platform.

SUMMARY

To minimize the limitations in the prior art, and to minimize other limitations that will become apparent upon reading and understanding the present specification, the following discloses a new and useful computer-implemented method for controlling privileged operations.

One embodiment may a computer-implemented method for controlling privileged operations on a client computer system having an operating system defining a kernel space, the steps comprising: providing a kernel module having a kernel authorization subsystem for the kernel space of the client computer system, the kernel module being loadable to the client computer system and may be configured to intercept one or more file operations; wherein the kernel authorization subsystem may be configured to manage authorization of the one or more file operations; registering, by the kernel module, a listener for the kernel authorization subsystem; monitoring, by the kernel module, the one or more file operations for a file access, and calling the registered listener by the kernel authorization subsystem when the kernel authorization subsystem detects the file access; identifying, by the kernel module, the file access and then calling a privileged daemon when the kernel module identifies the file access, the privileged daemon being configured to perform an authorization process with at least one root-user privilege; checking a policy, by the privileged daemon, and determining, based on the policy, whether at least one applied rule is applicable; if the at least one applied rule is applicable, initializing, by the privileged daemon, a launcher module with at least one parameter identifying a target application; and launching the target application, by the launcher module, with the at least one root-user privilege. When the kernel module identifies the file access, the registered listener may obtain a file name of the file access and may provide the file name to the privileged daemon, such that the privileged daemon checks the policy with the file name to determine whether the at least one applied rule is applicable. The computer-implemented method may further comprise the step: terminating the checking step of the privileged daemon, when the privileged daemon determines the at least one applied rule. The computer-implemented method may further comprise the steps: requesting, by a running application, one or more restricted operations; wherein the one or more restricted operations may be associated with one or more authorization rights that define one or more checks that must be performed in order to grant access to the one or more restricted operations; and calling, by the running application, an authorization subsystem to perform the one or more checks on the one or more authorization rights. The one or more authorization rights may comprise one or more customized mechanism rights created by the privileged daemon. The computer-implemented method may further comprise the steps: requesting, by the running application, the one or more customized mechanism rights; invoking, by the authorization subsystem, an authorization plugin; and calling, by the authorization plugin, the privileged daemon to lookup the policy to determine whether the at least one applied rule, which allows the one or more restricted operations, should be applied. The computer-implemented method may further comprise the steps: providing, by the privileged daemon, a success status notification to the authorization plugin, when the privileged daemon locates the at least one applied rule for the one or restricted operations; forwarding, by the authorization plugin, the success status notification to the authorization subsystem; and authorizing, by the authorization subsystem, the one or more restricted operations to the running application. The one or more customized mechanism rights may be created via the following steps: obtaining a list of one or more regular rights; copying the one or more regular rights to create one or more copied rights; renaming the one or more copied rights to create one or more renamed rights, the one or more renamed rights preserve a function of the one or more regular rights; and modifying the one or more regular rights by applying at least one modification to create the one or more customized mechanism rights. The operating system may further comprise a service module and a message module; wherein the service module may be configured to expose a context menu for inputting one or more shell rules; and wherein the message module may be configured to display one or more messages for the at least one applied rule.

Another embodiment may be a computer-implemented method for controlling privileged operations on a client computer system having an operating system defining a kernel space, the steps comprising: providing a kernel module having a kernel authorization subsystem for the kernel space of the client computer system, the kernel module being loadable to the client computer system and may be configured to intercept one or more file operations; wherein the kernel authorization subsystem may be configured to manage authorization of the one or more file operations; registering, by the kernel module, a listener for the kernel authorization subsystem; monitoring, by the kernel module, the one or more file operations for a file access, and calling the registered listener by the kernel authorization subsystem when the kernel authorization subsystem detects the file access; identifying, by the kernel module, the file access and then calling a privileged daemon when the kernel module identifies the file access, the privileged daemon being configured to perform an authorization process with at least one root-user privilege; checking a policy, by the privileged daemon, and determining, based on the policy, whether at least one applied rule is applicable; if the at least one applied rule is applicable, initializing, by the privileged daemon, a launcher module with at least one parameter identifying a target application; launching the target application, by the launcher module, with the at least one root-user privilege; informing the kernel module, by the privileged daemon, of the at least one applied rule; and denying, by the kernel module, the file access via the kernel authorization subsystem, such that executing the target application with a standard user privilege does not succeed. When the kernel module identifies the file access, the registered listener may obtain a file name of the file access and may provide the file name to the privileged daemon, such that the privileged daemon checks the policy with the file name to determine whether the at least one applied rule is applicable. The computer-implemented method may further comprise the step: terminating the checking step of the privileged daemon, when the privileged daemon determines that the at least one applied rule is applicable. The computer-implemented method may further comprise the steps: requesting, by a running application, one or more restricted operations; wherein the one or more restricted operations may be associated with one or more authorization rights that define one or more checks that must be performed in order to grant access to the one or more restricted operations; and calling, by the running application, an authorization subsystem to perform the one or more checks on the one or more authorization rights. The one or more authorization rights may comprise one or more customized mechanism rights created by the privileged daemon. The computer-implemented method may further comprise the steps: requesting, by the running application, the one or more customized mechanism rights; invoking, by the authorization subsystem, an authorization plugin; and calling, by the authorization plugin, the privileged daemon to lookup the policy to determine whether at least one applied rule, which allows the one or more restricted operations, should be applied. The computer-implemented method may further comprise the steps: providing, by the privileged daemon, a success status notification to the authorization plugin, when the privileged daemon locates the at least one applied rule for the one or restricted operations; forwarding, by the authorization plugin, the success status notification to the authorization subsystem; and authorizing, by the authorization subsystem, the one or more restricted operations to the running application. The one or more customized mechanism rights may be created via the following steps: obtaining a list of one or more regular rights; copying the one or more regular rights to create one or more copied rights; renaming the one or more copied rights to create one or more renamed rights, the one or more renamed rights preserve a function of the one or more regular rights; and modifying the one or more regular rights by applying at least one modification to create the one or more customized mechanism rights; wherein the at least one modification may be selected from the group of modifications consisting of: a class key configuration and a mechanisms key configuration. The operating system may further comprise a service module and a message module; wherein the service module may be configured to expose a context menu for inputting one or more shell rules; and wherein the message module may be configured to display one or more messages for the at least one applied rule.

Another embodiment may be a computer-implemented method for controlling privileged operations on a client computer system having an operating system defining a kernel space, the steps comprising: providing a kernel module having a kernel authorization subsystem for the kernel space of the client computer system, the kernel module being loadable to the client computer system and may be configured to intercept one or more file operations; wherein the kernel authorization subsystem may be configured to manage authorization of the one or more file operations; registering, by the kernel module, a listener for the kernel authorization subsystem; monitoring, by the kernel module, the one or more file operations for a file access, and calling the registered listener by the kernel authorization subsystem when the kernel authorization subsystem detects the file access; calling a privileged daemon by the kernel module, when the kernel module identifies the file access, the privileged daemon being configured to perform an authorization process with at least one root-user privilege; checking a policy, by the privileged daemon, and determining, based on the policy, whether at least one applied rule is applicable; if the at least one applied rule is applicable, initializing, by the privileged daemon, a launcher module with at least one parameter identifying a target application; and launching the target application, by the launcher module, with the at least one root-user privilege. When the kernel module identifies the file access, the registered listener may obtain a file name of the file access and may provide the file name to the privileged daemon, such that the privileged daemon checks the policy with the file name to determine whether the at least one applied rule is applicable. The computer-implemented method may further comprise the following step: terminating the checking step of the privileged daemon, when the privileged daemon identifies the at least one applied rule. The computer-implemented method may further comprise the following steps: calling, by a running application, an authorization subsystem when the running application requests one or more restricted operations; and invoking, by the authorization subsystem, an authorization plugin when the running application requests the one or more customized mechanism rights, such that the authorization plugin calls the privileged daemon to lookup the policy to determine whether at least one rule allowing the one or more restricted operations should be applied; wherein the authorization plugin may facilitate control of one or more regular rights, the one or more regular rights include one or more customized mechanism rights created by the privileged daemon. The one or more restricted operations may be associated with one or more authorization rights requested by the running application; and wherein the one or more authorization rights may define one or more checks that the authorization subsystem performs in order to grant access to the one or more restricted operations. The computer-implemented method may further comprise the steps: providing, by the privileged daemon, a success status notification to the authorization plugin, when the privileged daemon locates the at least one applied rule for the one or restricted operations; forwarding, by the authorization plugin, the success status notification to authorization subsystem; and authorizing, by the authorization subsystem, the one or more restricted operations to the running application. The one or more customized mechanism rights may be created by the privileged daemon via the following steps: obtaining, by the privileged daemon, a list of the one or more regular rights; copying and renaming the one or more regular rights by the privileged daemon to create one or more renamed rights, the one or more renamed rights being configured to preserve a function of the one or more rights; and modifying the one or more regular rights associated with the one or more renamed rights by applying at least one modification to create the one or more customized mechanism rights. The operating system may further comprise a service module configured to expose a context menu for inputting one or more shell rules. The operating system may further comprise a message module configured to display one or more messages for the applied rule.

Another embodiment may be a computer-implemented method for controlling privileged operations on a client computer system having an operating system defining a kernel space, the steps comprising: providing a kernel module having a kernel authorization subsystem for the kernel space of the client computer system, the kernel module being loadable to the client computer system and may be configured to intercept one or more file operations; wherein the kernel authorization subsystem may be configured to manage authorization of the one or more file operations; registering, by the kernel module, a listener for the kernel authorization subsystem; monitoring, by the kernel module, the one or more file operations for a file access, and calling the registered listener by the kernel authorization subsystem when the kernel authorization subsystem detects the file access; calling a privileged daemon by the kernel module, when the kernel module identifies the file access, the privileged daemon being configured to perform an authorization process with at least one root-user privilege; checking a policy, by the privileged daemon, and determining, based on the policy, whether at least one applied rule is applicable; if the at least one applied rule is applicable, initializing, by the privileged daemon, a launcher module with at least one parameter identifying a target application; launching the target application, by the launcher module, with the at least one root-user privilege; informing the kernel module, by the privileged daemon, of the at least one applied rule; and denying, by the kernel module, the file access via the kernel authorization subsystem, such that executing the target application with a standard user privilege does not succeed. When the kernel module identifies the file access, the registered listener obtains a file name of the file access and provides the file name to the privileged daemon, such that the privileged daemon checks the policy with the file name to determine whether the at least one applied rule is applicable. The computer-implemented method may further comprise the following step: terminating the checking step of the privileged daemon, when the privileged daemon identifies the at least one applied rule. The computer-implemented method may further comprise the steps of: calling, by a running application, an authorization subsystem when the running application requests one or more restricted operations; and invoking, by the authorization subsystem, an authorization plugin when the running application requests the one or more customized mechanism rights, such that the authorization plugin calls the privileged daemon to lookup the policy to determine whether at least one applied rule allowing the one or more restricted operations should is applicable; wherein the authorization plugin may facilitate control of one or more regular rights, the regular rights including one or more customized mechanism rights created by the privileged daemon. The one or more restricted operations may be associated with one or more authorization rights requested by the running application; and wherein the one or more authorization rights may define one or more checks that the authorization subsystem may perform in order to grant access to the one or more restricted operations. The computer-implemented method may further comprise the steps: providing, by the privileged daemon, a success status notification to the authorization plugin, when the privileged daemon locates the at least one applied rule for the one or restricted operations; forwarding, by the authorization plugin, the success status notification to authorization subsystem; and authorizing, by the authorization subsystem, the one or more restricted operations to the running application. The one or more customized mechanism rights may be created by the privileged daemon via the following steps: obtaining, by the privileged daemon, a list of the one or more regular rights; copying and renaming the one or more regular rights by the privileged daemon to create one or more renamed rights, the one or more renamed rights being configured to preserve a function of the one or more regular rights; and modifying the one or more regular rights associated with the one or more renamed rights by applying at least one modification to create the one or more customized mechanism rights; wherein the at least one modification is selected from the group of modifications consisting of: a class key configuration and a mechanisms key configuration. The operating system may further comprise a service module configured to expose a context menu for inputting one or more shell rules. The operating system may further comprise a message module configured to display one or more messages for the applied rule.

It is an object of the new method to overcome the limitations of the prior art.

These, as well as other components, steps, features, objects, benefits, and advantages, will now become clear from a review of the following detailed description of illustrative embodiments, the accompanying drawings, and the claims.

BRIEF DESCRIPTION OF THE DRAWINGS

The drawings are of illustrative embodiments. They do not illustrate all embodiments. Other embodiments may be used in addition or instead. Details which may be apparent or unnecessary may be omitted to save space or for more effective illustration. Some embodiments may be practiced with additional components or steps and/or without all of the components or steps which are illustrated. When the same numeral appears in different drawings, it refers to the same or like components or steps.

DETAILED DESCRIPTION OF THE ILLUSTRATIVE EMBODIMENTS

In the following detailed description of various embodiments, numerous specific details are set forth in order to provide a thorough understanding of various aspects of one or more embodiments. However, these embodiments may be practiced without some or all of these specific details. In other instances, well-known methods, procedures, and/or components have not been described in detail so as not to unnecessarily obscure aspects of embodiments of the invention.

While multiple embodiments are disclosed, other embodiments will become apparent to those skilled in the art from the following detailed description, which shows and describes illustrative embodiments. As will be realized, the invention is capable of modifications in various obvious aspects, all without departing from the spirit and scope of protection. Accordingly, the graphs, figures, and the detailed descriptions thereof, are to be regarded as illustrative in nature and not restrictive. Also, the reference or non-reference to a particular embodiment of the invention shall not be interpreted to limit the scope of the invention.

In the following description, certain terminology is used to describe certain features of the following embodiments. For example, as used herein, the terms "computer" and "computer system" generally refer to any device that processes information with an integrated circuit chip.

As used herein, the terms "software" and "application" refer to any set of machine-readable instructions on a machine, web interface, and/or computer system" that directs a computer's processor to perform specific steps, processes, or operations disclosed herein. The application or software may comprise one or more modules that direct the operation of the computer system on how to perform the disclosed method.

As used herein, the term "computer-readable" medium may refer to any storage medium adapted to store data and/or instructions that are executable by a processor of a computer system. The computer-readable storage medium may be a computer-readable non-transitory storage medium and/or any non-transitory data storage circuitry (e.g., buggers, cache, and queues) within transceivers of transitory signals. The computer-readable storage medium may also be any tangible computer readable medium. In various embodiments, a computer readable storage medium may also be able to store data, which is able to be accessed by the processor of the computer system.

Certain functions of various operating systems (e.g., OS X® operation system) and applications (e.g., OS X® applications) generally require privileged operations. In order for a computer system to perform these privileged operations, a user generally must be a member of an administrator group or domain, as a member of these groups generally can perform any privileged operation without a restriction.

One drawback to assigning privileges operations to certain groups is that this may allow greater access and other privileges to unintended users. In order to resolve this over-powered access control, the systems and methods disclosed herein generally allow selected privileged operations to standard unprivileged users. Such privileged operations include: (1) launching processes with root-user privileges and (2) restricted operations that require authorization—obtaining rights to perform restricted operations, The allowed privileged operations are generally selected by a policy comprising a set of rules. Each rule generally has attributes as defined in Table I below:

TABLE I

| Attribute | Description |
| --- | --- |
| Type | Type defines how the rule is applied. There are two possible values: path - specifies that rule is always applied to privileged operations associated with application file system location; shell - the same as path, but rule is applied only when user explicitly invokes it with corresponding user interface command (Finder context menu). |
| Action | Action defines what privileged operation is allowed by rule. There are two possible values: Run application as root - specifies that target application is launched as root-user; Authorize application as administrator - specifies that restricted operations, required by target application, are authorized |
| User Message | Defines what message will be displayed to user when rule is applied. |
| Path | Path defines target application by file system location. |
| Arguments | Defines arguments used to launch target application. |
| Publisher | Defines signer information of target application. |

Figure 1:
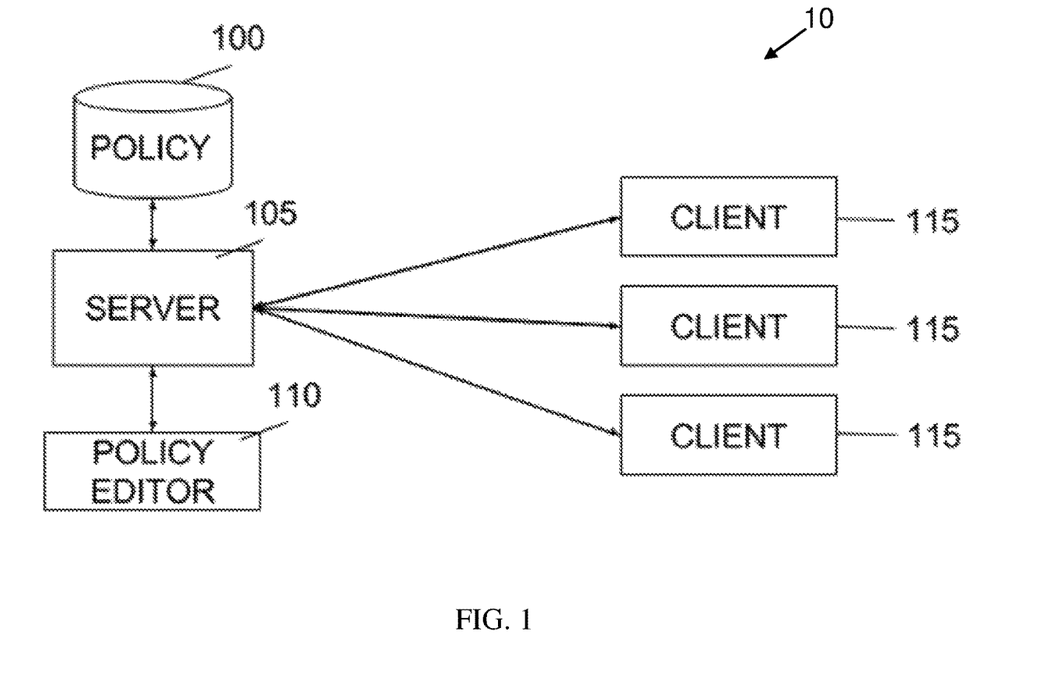
FIG. 1 is a block diagram of one embodiment of a system for controlling privileged operations.

FIG. 1 is a block diagram of one embodiment of a system for controlling privileged operations. As shown in FIG. 1, one embodiment of a system 10 for controlling privileged operations may comprise: a policy 100, a policy editor 110, one or more clients 115, and a server 105. The policy 100 may be one or more set of rules associated with an operating system (or applications) for a group of computer users and preferably restricts access to certain content. The policy 100 may be stored in the server 105 and may also be modified by the server 105 via commands received from the policy editor 110. The policy 100 may also be established by the administrator and may be stored in a policy file. In various embodiments, the policy 100 may be a single file containing one or more policy rules or statements or may be a plurality of files, each of which may contain one or more policy instructions. For example, in various embodiments, the policy 100 may comprise a list of access control rules or access control policies.

The policy editor 110 may be a software or application used to create or configure the policy 100. Specifically, the policy editor 110 may provide the user with the ability to create and/or manage security policies and assign these policies to desired content, such that certain users may access such content. Thus, the policy editor 110 may enable an authenticated and authorized user to create and configure security services or apply a policy to protect content. In one embodiment, the policy editor 110 may be a visual editing tool or graphical user interface system that is intended for use by authorized users to generate and apply security policies to their content. The policy editor 110 may also be an interface to enable the configured security features to be propagated and enforced throughout the overlay of the network infrastructure. The policy editor 110 may utilize dialog boxes, menus, sub-menus, and the like in order to produce policy statements, rules, or instructions from users. In an alternative embodiment, the policy editor 110 may be a simple text editor, such as those used for creating source code for a conventional computer language compiler.

The server 105 is generally a computer program or a device that provides functionality for other client programs or devices. The server 105 may be local (e.g., within a building or facility) or remote (outside the vicinity) and may be used for electronic data transfer. The server 105 may also serve as a backend that stores and distributes the policy 100 and associated events and reports.

The client 115 may be any computer hardware or software that accesses a service made available by a server 105. For instance, the client 115 may be software that is installed on one or more client computer systems and may also be configured to send requests to the server 105 to receive the policy 100. In response, the server 105 may send the policy 100 to the client(s) 115. The client 115 may also be any device configured to connecting to a network and may transmit or receive data from another device. Examples of such client computers may include, without limitation, to personal computers (e.g., desktop PCs, Apple® computers), laptops and notebook computers, tablet computers, smartphones, game consoles, and the like.

Importantly, FIG. 1 shows that various embodiments of the system 10 for controlling privileged operations may be in a client/server computer arrangement. This client/server computer arrangement may be configured as a local area network (LAN), wide area network (WAN), personal area network (PANs), and/or metropolitan area network (MAN). For instance, in some embodiments, the LANs may be a computer network that interconnects client computers and server 105 in a limited area such as a home or building and may utilize various LAN technologies such as Ethernet with twisted pair cabling and wireless technology (e.g., Wi-Fi®).

In some embodiments, the LAN may comprise a router, server, access points, and client computer systems. Each client computer system may further comprise client software, as discussed above. In various embodiments, LANs generally provide higher data transfer rates than WANs. File access by the client 115 may be redirected by the local domain name server (DNS) to the server 105 when the DNS determines that the destination for the data is within client devices of the LAN. In other embodiments, the data transfer may be encrypted at the client devices using known encryption algorithms. Encrypting the data locally before transmission to the server 105 may help prevent unwanted access to the data. In other embodiments, the server 105 may be operated by a hosting service in a cloud computing environment.

In other embodiments, the system 10 may also be arranged as WANs, which may be a network that covers a broad area such as the Internet. The WAN may further comprise LANs via routers, so that users of other devices in one location may communicate with a remote server in another remote location. In various embodiments, WANs may be created using leased lines, circuit switching, and/or packet switching technologies and may utilize various protocols such as TCP/IP to deliver transport and addressing functions.

Figure 2:
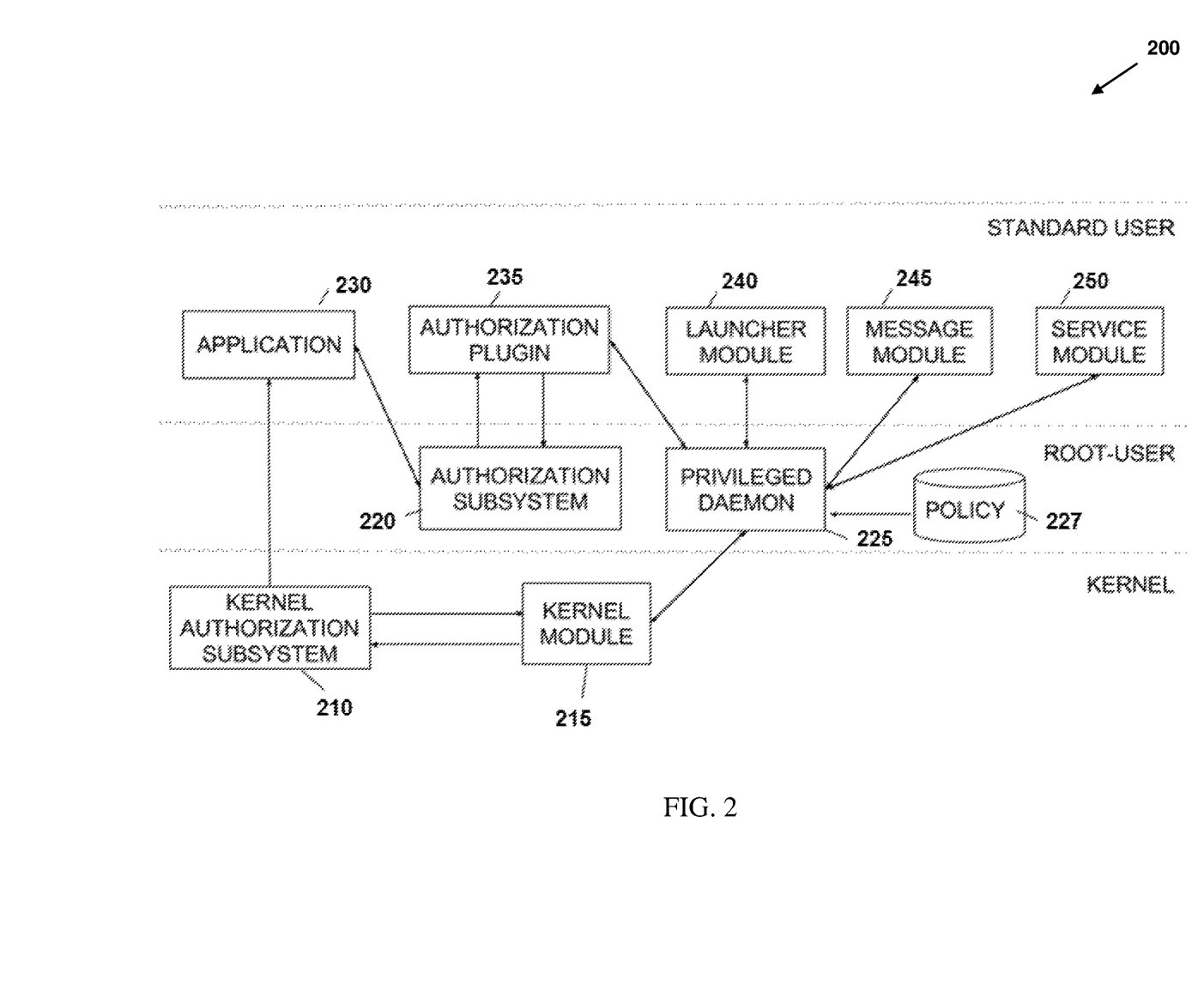
FIG. 2 is a block diagram of one embodiment of a client software for a computer system.

FIG. 2 is a block diagram of one embodiment of a client software for a computer system. As shown in FIG. 2, one embodiment of the client software 200 may comprise: a kernel authorization subsystem 210, kernel module 215, an authorization subsystem 220, privileged daemon 225, an authorization plugin 235, launcher module 240, message module 245, and service module 250.

The kernel module 215 may be an object file comprising code to extend a kernel of an operating system (e.g., Microsoft® Windows®, Linux, Mac® OS X®). The kernel module 215 may be configured to detect file operations and may be used to improve security of the overall data control solution. This is due to the fact that the kernel module 215 is generally only accessible by an administrator (and privileged users) and may prevent less privileged users from altering, disabling, or removing the kernel module 215. Examples of kernel modules may include, without limitation, kernel-mode drivers supported by Microsoft® Windows® operating systems, kernel extensions supported by Mac® OS X® operating systems, loadable kernel modules supported by Linux® operating systems, kernel loadable modules supported by FreeBSD operating systems, and the like. In one embodiment, the kernel module 215 may be a loadable kernel module that intercepts file operations.

The kernel authorization subsystem 210 is preferably a kernel subsystem used for managing authorization within the kernel. The kernel authorization subsystem 210, for example, may allow users to simplify the implementation of access control lists (ACLs). In some embodiments, the kernel authorization subsystem 210 may be configured to modify authorization decisions, export a kernel programming interface (KPI) that allows third party kernel developers to authorize actions within the kernel, and extend the kernel's authorization landscape. The kernel authorization subsystem 210 may also be used as a notification mechanism.

The authorization subsystem 220 may facilitate access control to restricted areas of the operating system and may allow an administrator or privileged user to restrict access of other users. Thus, the authorization subsystem 220 may be used to restrict access to certain tools or may require access to restricted areas of the operating system. In one embodiment, the authorization subsystem 220 may be used in a Mac® OS X® operating system.

The privileged daemon 225 may be a computer program or process that runs in the background with root-user privileges. The privileged daemon 225 may be used to handle service requests associated with process rights management and may be configured only by the administrator or other privileged users.

The authorization plugin 235 is preferably a code or module that interacts with an authorization framework to perform specific authorization processes on demand. The authorization plugin 235 may be used to access policies, and may execute its own authorization process independent of the other plugins within the client. In a preferred embodiment, authorization plugin 235 may be used to intercepts authorization requests.

The launcher module 240 may be code or program configured to launch applications running on the operating system. Preferably, the launcher module 240 may be configured to launch applications with root-user privileges.

The service module 250 may be a code or program configured to expose context menu for shell rules. The message module 245 may be a code or program that displays messages when one or rules are applied.

FIG. 2 also shows how various components of the client software 200 interact with one another. The kernel module 215 may register a listener for the kernel authorization subsystem 210, which may be part of operation system (e.g., OS X®). The listener may be a mechanism for monitoring file accesses by one or more processes, and, in one embodiment, may be registered using Kauth_listen_scope( ) for Mac® OS X® operating systems. When the kernel authorization subsystem 110 detects a file access, the kernel authorization subsystem 110 may call the listener registered by the kernel module 215. In the event the kernel module 215 identifies the file access for execution, the kernel module 215 may call the privileged daemon 225 to perform a lookup on the policy 227 to determine if an applied rule is applicable. If an applied rule is found by the privileged daemon 225, the launcher module 240 may be launched with arguments or parameters identifying the target application. The launcher module 240 then may launch the target application with root-user privileges. Here, the privileged daemon 225 may also inform the kernel module 215 of the applied rule, wherein the kernel module 215 may then deny the original file access via the kernel authorization subsystem 210 interface. As a result, the original path of the application execution under standard user privileges preferably does not succeed.

Figure 3:
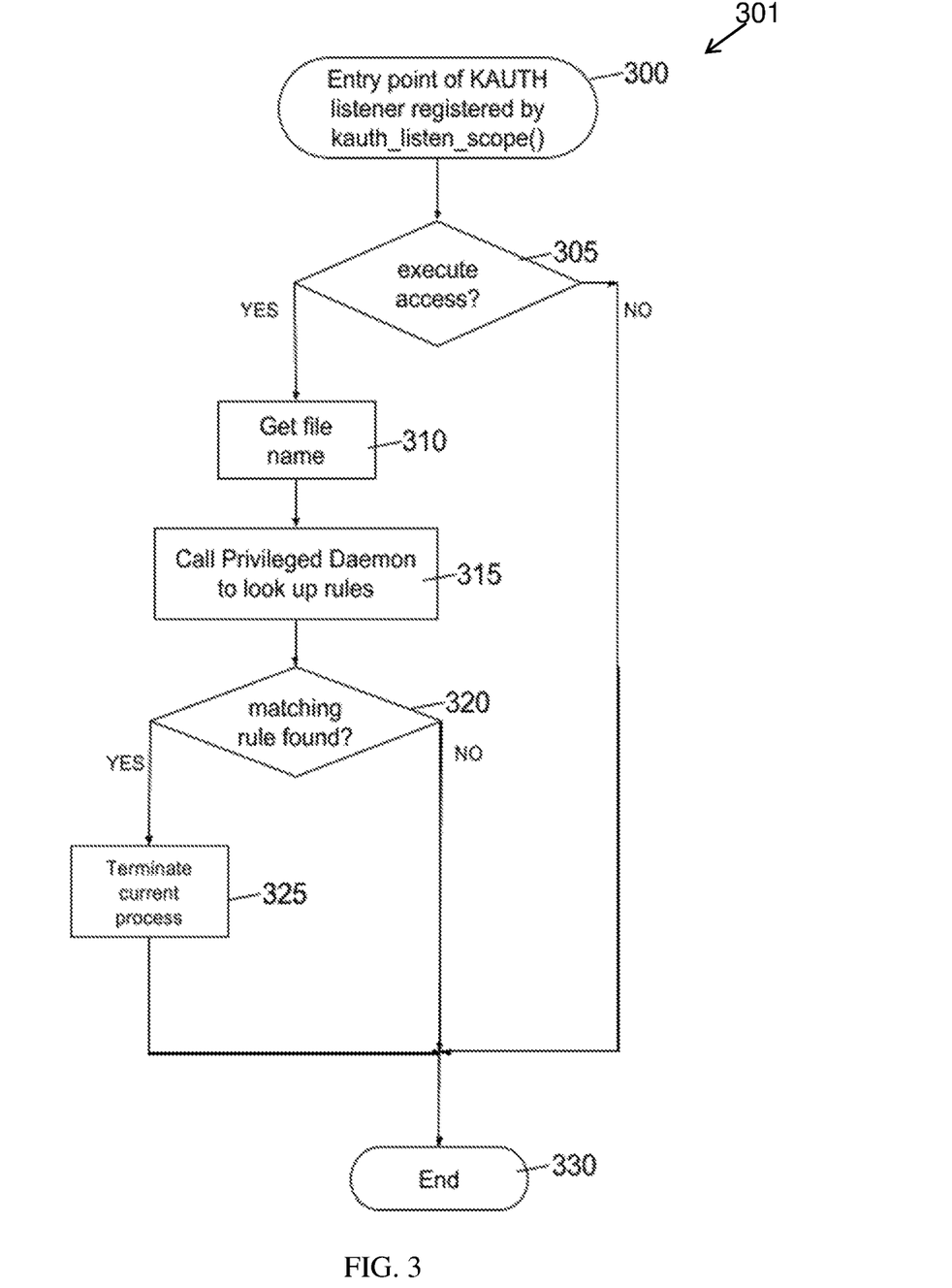
FIG. 3 is a flow chart depicting one embodiment of a method for controlling privileged operations using a listener for a kernel authorization subsystem.

FIG. 3 is a flow chart depicting one embodiment of a method for controlling privileged operations using a listener for a kernel authorization subsystem. As shown in FIG. 3, one embodiment of the method 301 may comprise steps: 300, 310, 315, 320, 325, 330.

At step 300, the entry point to the listener of the kernel module 215 may be registered by Kauth_listen_scope( ), as discussed in FIG. 2 above, and may be called by the kernel authorization subsystem 210 upon access to a file. At step 305, the method 301 may first include a step of checking for a file access. In the event an execution access is requested, the listener may obtain a file name, as shown in step 310, and may forward that file name to the privileged daemon 225, as shown in step 315. The privileged daemon 225 may then perform a lookup of rules to determine whether an applied rule is applicable. In the event the privileged daemon 225 locates an applied rule, privileged daemon 225 may return the code associated with the applied rule. The method 301 may then terminate the current process, as shown in step 325. In the event no applied rule is found by the privileged daemon 225, then the method 301 may end the operation at step 330. The method 301 also may end operation at step 330 if no execution access is requested as verified at step 305.

When a running application 230 requests authorization for one or more restricted operations, the running application 230 may call the authorization subsystem 220, which is generally part of the operating system (e.g., Mac® OS X®). The restricted operations may be associated with authorization rights requested by the running application 230.

In various embodiments, an authorization right generally describes what checks the authorization subsystem 220 should perform in order to grant access to restricted operations because the operating system such as the Mac® OS X® may maintain regular rights and supports these rights with customized mechanism rights via the authorization plugins 235. The authorization plugins 235 may be invoked when a running application 230 requests such customized mechanism rights. Thus, when the running application 230 requests customized mechanism rights specifically created by the privileged daemon 225, authorization subsystem 220 may invoke the authorization plugin 235. Here, the authorization plugin 235 may call the privileged daemon 225, so that the privileged daemon 225 may look up the policy 227 to determine whether an applied rule allowing the restricted operations is applicable. If an applied rule is found by the privileged daemon 225, the privileged daemon 225 may return a success status to the authorization plugin 235. Then the authorization plugin 235 may then forward the success status to the authorization subsystem 220, as the authorization subsystem 220 preferably authorizes the restricted operations to the running application 230. In the event no applied rule is found by the privileged daemon 225, then the authorization plugin 235 may initiate a regular authorization procedure associated with the requested customized mechanism right.

Figure 5:
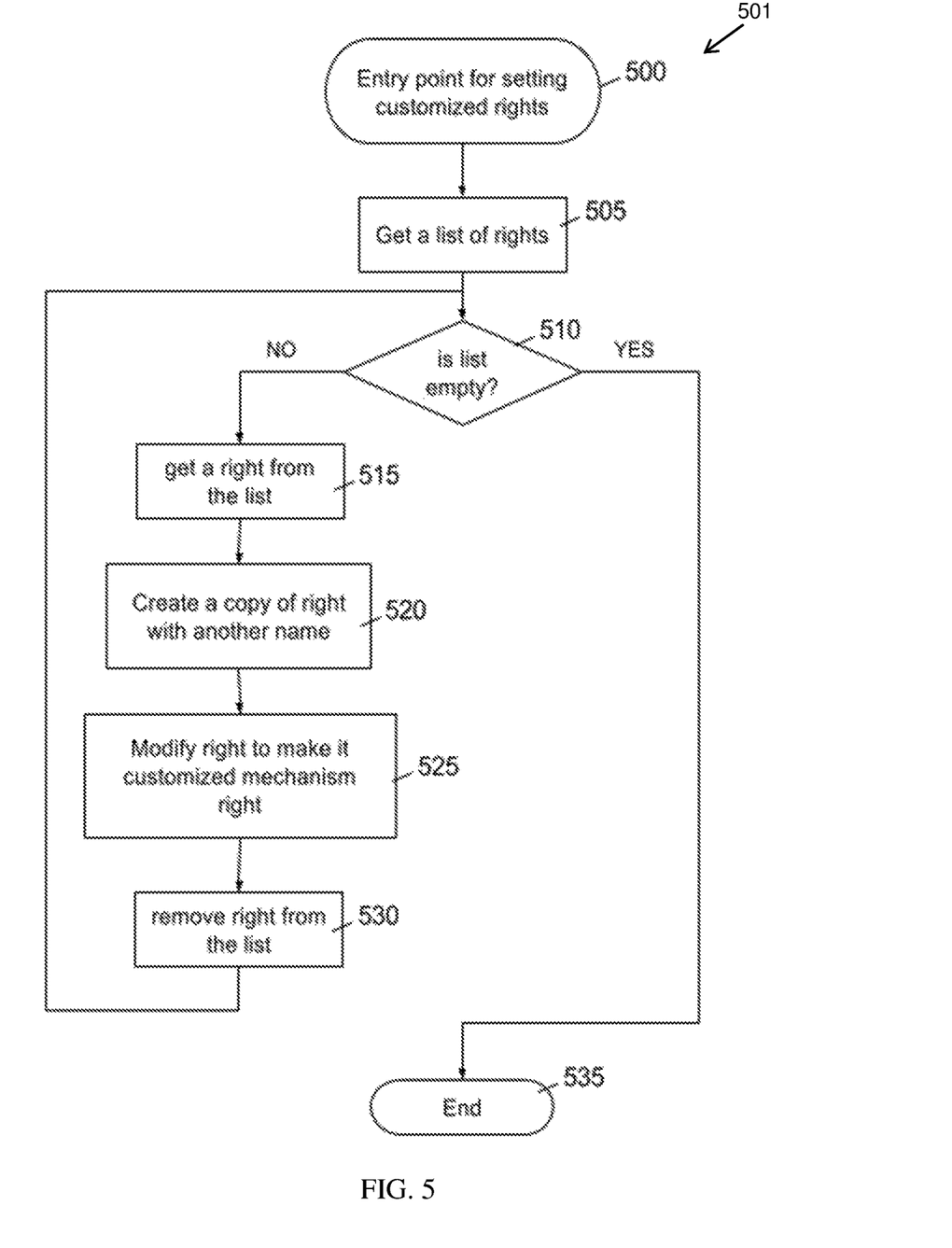
FIG. 5 is a flow chart depicting one embodiment of a method of setting customized mechanism rights by a privileged daemon.

In various embodiments, customized mechanism rights requested by the running application 230 may be created by the privileged daemon 225. In this manner, the running application 230 generally must be aware of the customized mechanism rights, which generally requires modification of the running application 230. In order to avoid this modification, the privileged daemon 225 may create proxies of these regular rights, which are preferably the customized mechanism rights. Specifically, as the regular rights are identified by name, the privileged daemon 225 generally renames the regular rights and creates new customized mechanism rights having the same names, as depicted in FIG. 5. This generally allows invoking the authorization plugin 235 for all rights which are replaced by the privileged daemon 225 by utilizing customized mechanism rights with the same names. In order to preserve standard rights authorization procedures, the authorization plugin 235 forwards the request with the renamed right to the authorization subsystem 220 if no applied rule is found.

Figure 4:
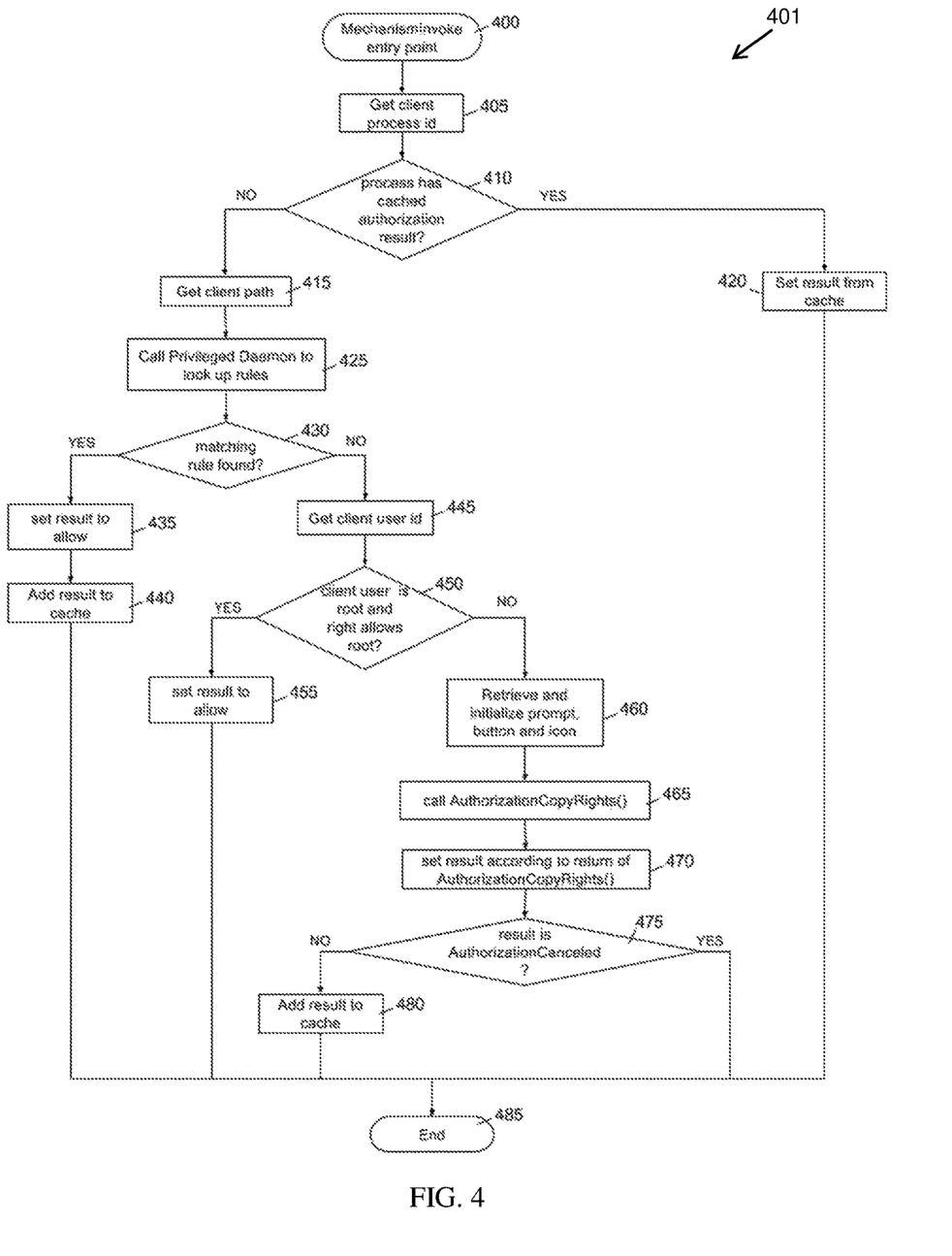
FIG. 4 is a flow chart depicting one embodiment of a method for controlling privileged operations using an authorization plugin.

FIG. 4 is a flow chart depicting one embodiment of a method for controlling privileged operations using an authorization plugin. Specifically, FIG. 4 shows the use of a MechanismInvoke callback of an authorization plugin 235 for an OS X® operating system. As shown in FIG. 4, one embodiment of the method 401 may comprise steps: 405, 410, 415, 420, 425, 430, 435, 440, 445, 450, 455, 460, 465, 470, 475, 480, 485. First, the authorization subsystem 220 may invoke the entry point 400 of MechanismInvoke callback to perform an authorization. At step 405 of the method 401, a client process ID is obtained, wherein the client process is the process that requested an authorization to perform one or more restricted operations. The method 401 may next include a verification step at step 410 to determine whether there is a cached authorization result. In the event a cached authorization is found, the cached authorization may be used as the result in step 420, and the method 401 may terminate the operation at step 485. On the other hand, if no cached authorization is found, the method 401 may include a step in obtaining a client path to determine a client file system location, as shown in step 415. The privileged daemon 225 may then be called to search for one or more applied rules, as shown in step 425. In the event an applied rule is found, then the authorization result is set to "allow"

and is then added to the cache, as shown in steps 435 and 440, respectively. The method 401 may then end the operation at step 485. On the other hand, if no applied rule is found, the method 401 may include obtaining the client user ID, as shown in step 445. If the client user ID is equal to a root user ID and if the requested right allows root-user authorization, then the result is set to "allow" and the method 401 may terminate operation at step 485. Otherwise the method 401 may retrieve and initialize prompt, button and icon parameters for AuthorizationCopyRights( ) API call at step 460. The AuthorizationCopyRights( ) may be an API that facilitates access control to restricted areas of the operating system and may restrict a user's access to particular features in the application(s). At step 465, the method 401 may then call the AuthorizationCopyRights( ) API with the renamed right name as described above. Then method 401 then may set the authorization result according to return of AuthorizationCopyRights( ) call in step 470 and may then add this result to the cache, as shown in step 480, if the result is not equal to errAuthorizationCanceled, as shown in step 475. In one embodiment, the errAuthorizationCanceled is an error code that indicates that the authorization procedure is canceled by the user. At this point the method 401 may end at operation 485.

FIG. 5 is a flow chart depicting one embodiment of a method of setting customized mechanism rights by a privileged daemon. The method 501 of setting customized mechanism rights preferably enables invocation of the authorization plugin 235 for the regular rights. As shown in FIG. 5, one embodiment of the method 501 may comprise steps: 500, 505, 510, 515, 520, 525, 530, 535. At step 505, a list of regular rights may be obtained and redirected to the authorization plugin 235 for processing authorization procedures. If the list is empty, the operation may end at step 535. On the other hand, if list is not empty, a regular right is retrieved from the list at step 515. A copy of this regular right is created with another name at step 520. The regular right, which was previously copied and renamed, may then be modified to create a customized mechanism right. Such modifications may include, without limitation, setting "class" key to "evaluate-mechanisms" and setting "mechanisms" key to the name corresponding authorization plugin 235. The description of these keys may be available in OS X® documentation found at the Apple® website. At step 530, the method 501 removes the processed regular right from the list and goes at operation 510.

When privileged daemon 225 finds an applied rule, the privileged daemon 225 may launch message module 245 to display a message to user and in order to retrieve an input required by this rule. Service module 250 may also be integrated into the OS X® to display a context menu item in Finder (OS X® application). When user locates a file in Finder® and selects that menu item, the service module 250 may send a request to the privileged daemon 225. The privileged daemon 225 may then handle the request by looking up the rules. In the event, a matching shell rule is found, the privileged daemon 225 may label the application for a rule match on next calls from kernel module 215 or authorization plugin 235.

The methods and systems disclosed herein are not limited to a particular hardware or software configuration, and may find applicability in many computing or processing environments. The methods and systems may be implemented in hardware or software, or a combination thereof. The methods and systems may be implemented in one or more computer programs, where a computer program may be understood to include one or more processor executable instructions. The computer program(s) may execute on one or more programmable processors, and may be stored on one or more storage mediums (i.e., computer readable medium) readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation. Those skilled in the art will appreciate that the RAM, RAID, floppy disks, optical medium (e.g., CD and DVD disks), magnetic disks, internal hard drive, external hard drive, memory stick or other storage device may also be computer readable mediums.

The computer program(s) may be implemented using one or more high level procedural or object-oriented programming languages to communicate with a computer system. However, the program(s) may be implemented in assembly or machine language, if desired. The language may be compiled or interpreted.

The processor(s) may be embedded in one or more devices that may be operated independently or together in a networked environment, where the network may include, for example, a local area network (LAN), wide area network (WAN), an intranet, the Internet, and/or another network. The network(s) may be wired, wireless, or a combination thereof and may utilize one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single or multiple processor/devices.

The device(s) (e.g., computers) that integrate with the processor(s) may include, without limitation, for example, a personal computer(s), workstation (e.g., Sun®, Hewlett Packard®), personal digital assistant (PDA), handheld device such as cellular telephone, laptop, handheld, or another device capable of being integrated with a processor(s) that may operate as provided herein. Accordingly, the devices provided herein are not exhaustive and are provided for illustration and not limitation. Similarly, as used herein a system may be a single digital device (e.g., a computer) or may comprise multiple digital devices.

As used herein, the terms "microprocessor" and "processor," may be understood to include one or more microprocessors that may communicate in a stand-alone and/or a distributed environment(s), and may thus may be configured to communicate via wired or wireless communications with other processors, wherein such one or more processor may be configured to operate on one or more processor-controlled devices that may be similar or different devices. Use of such "microprocessor" or "processor" terminology or the like may thus also be understood to include a central processing unit, an arithmetic logic unit, an application-specific integrated circuit (IC), and/or a task engine, with such examples provided for illustration and not limitation.

Furthermore, memory, unless otherwise specified, may include, without limitation, one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix®, Oracle®) and also proprietary databases, and may also include other structures for associating memory such as links, queues, graphs, trees, with such structures provided for illustration and not limitation.

References to a network, unless provided otherwise, may include, without limitation, one or more intranets and/or the Internet. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously, many modifications and variations may become apparent in light of the above teachings. Many additional changes in the details, materials, and arrangement of parts, herein described and illustrated, may be made by those skilled in the art. Accordingly, it will be understood that the disclosed methods and systems are not to be limited to the embodiments disclosed herein, may include practices otherwise than specifically described, and are to be interpreted as broadly as allowed under the law.

The methods and systems described herein may be deployed in part or in whole through a machine that executes computer software, application, program codes, and/or instructions on a processor. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more threads. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In some embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, in some embodiments, other devices may be required for execution of methods as described in this application may be considered as a part of the infrastructure associated with the server.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, in some embodiments, other devices may be required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the embodiments discussed herein. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g., USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, without limitation, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While various embodiments have been disclosed and described in detail, various modifications and improvements thereon will become readily apparent to those skilled in the art. Accordingly, the spirit and scope of the present description is not to be limited by the foregoing examples, but is to be understood in the broadest sense allowable by law.

All documents referenced herein are hereby incorporated by reference.

While the foregoing written description enables one of ordinary skill to make and use what is considered presently to be the best mode thereof, those of ordinary skill will understand and appreciate the existence of variations, combinations, and equivalents of the specific embodiment, method, and examples herein. These embodiments therefore are not be limited by the above described illustrated embodiments, methods, and examples, but by all embodiments and methods within the scope as claimed.

Except as stated immediately above, nothing which has been stated or illustrated is intended or should be interpreted to cause a dedication of any component, step, feature, object, benefit, advantage, or equivalent to the public, regardless of whether it is or is not recited in the claims.

What is claimed is:

1. A computer-implemented method for controlling privileged operations on a client computer system having an operating system defining a kernel space, the steps comprising:
   providing a kernel module having a kernel authorization subsystem for the kernel space of the client computer system, the kernel module being loadable to the client computer system and is configured to intercept one or more file operations, wherein the kernel authorization subsystem is configured to manage authorization of the one or more file operations;
   registering, by the kernel module, a listener for the kernel authorization subsystem;
   monitoring, by the kernel module, the one or more file operations for a file access, and calling the registered listener by the kernel authorization subsystem when the kernel authorization subsystem detects the file access;
   identifying, by the kernel module, the file access and then calling a privileged daemon when the kernel module identifies the file access, the privileged daemon being configured to perform an authorization process with at least one root-user privilege;
   checking a policy, by the privileged daemon, and determining, based on the policy, whether at least one applied rule is applicable;
   if the at least one applied rule is applicable, initializing, by the privileged daemon, a launcher module with at least one parameter identifying a target application;
   launching the target application, by the launcher module, with the at least one root-user privilege;
   receiving a request, from a running application, for one or more restricted operations, wherein the one or more restricted operations are associated with one or more authorization rights that define one or more checks that must be performed in order to grant access to the one or more restricted operations; and
   receiving, by an authorization subsystem and from the running application, a request to perform the one or more checks on the one or more authorization rights, wherein the one or more authorization rights comprise one or more customized mechanism rights created by the privileged daemon.

2. The computer-implemented method of claim 1, wherein, when the kernel module identifies the file access, the registered listener obtains a file name of the file access and provides the file name to the privileged daemon, such that the privileged daemon checks the policy with the file name to determine whether the at least one applied rule is applicable.

3. The computer-implemented method of claim 1, further comprising the steps:
   requesting, by the running application, the one or more customized mechanism rights;
   invoking, by the authorization subsystem, an authorization plugin; and
   calling, by the authorization plugin, the privileged daemon to lookup the policy to determine whether the at least one applied rule, which allows the one or more restricted operations, should be applied.

4. The computer-implemented method of claim 3, further comprising the steps:
   providing, by the privileged daemon, a success status notification to the authorization plugin, when the privileged daemon locates the at least one applied rule for the one or restricted operations;
   forwarding, by the authorization plugin, the success status notification to the authorization subsystem; and
   authorizing, by the authorization subsystem, the one or more restricted operations to the running application.

5. The computer-implemented method of claim 1, wherein the one or more customized mechanism rights are created via the following steps:
   obtaining a list of one or more regular rights;
   copying the one or more regular rights to create one or more copied rights;
   renaming the one or more copied rights to create one or more renamed rights, the one or more renamed rights preserve a function of the one or more regular rights; and modifying the one or more regular rights by applying at least one modification to create the one or more customized mechanism rights.

6. The computer-implemented method of claim 1, wherein the operating system further comprises a service module and a message module;
   wherein the service module is configured to expose a context menu for inputting one or more shell rules; and
   wherein the message module is configured to display one or more messages for the at least one applied rule.

7. The computer-implemented method of claim 1, wherein the operating system comprises the authorization subsystem.

8. A computer-implemented method for controlling privileged operations on a client computer system having an operating system defining a kernel space, the steps comprising:
providing a kernel module having a kernel authorization subsystem for the kernel space of the client computer system, the kernel module being loadable to the client computer system and is configured to intercept one or more file operations, wherein the kernel authorization subsystem is configured to manage authorization of the one or more file operations;
registering, by the kernel module, a listener for the kernel authorization subsystem;
monitoring, by the kernel module, the one or more file operations for a file access, and calling the registered listener by the kernel authorization subsystem when the kernel authorization subsystem detects the file access;
identifying, by the kernel module, the file access and then calling a privileged daemon when the kernel module identifies the file access, the privileged daemon being configured to perform an authorization process with at least one root-user privilege;
checking a policy, by the privileged daemon, and determining, based on the policy, whether at least one applied rule is applicable;
if the at least one applied rule is applicable, initializing, by the privileged daemon, a launcher module with at least one parameter identifying a target application;
launching the target application, by the launcher module, with the at least one root-user privilege;
informing the kernel module, by the privileged daemon, of the at least one applied rule;
denying, by the kernel module, the file access via the kernel authorization subsystem,
such that executing the target application with a standard user privilege does not succeed;
requesting, by a running application, one or more restricted operations; wherein the one or more restricted operations are associated with one or more authorization rights that define one or more checks that must be performed in order to grant access to the one or more restricted operations; and
calling, by the running application, an authorization subsystem to perform the one or more checks on the one or more authorization rights, wherein the one or more authorization rights comprise one or more customized mechanism rights created by the privileged daemon.

9. The computer-implemented method of claim 8, wherein, when the kernel module identifies the file access, the registered listener obtains a file name of the file access and provides the file name to the privileged daemon, such that the privileged daemon checks the policy with the file name to determine whether the at least one applied rule is applicable.

10. The computer-implemented method of claim 8, further comprising the steps:
requesting, by the running application, the one or more customized mechanism rights;
invoking, by the authorization subsystem, an authorization plugin; and
calling, by the authorization plugin, the privileged daemon to lookup the policy to determine whether at least one applied rule, which allows the one or more restricted operations, should be applied.

11. The computer-implemented method of claim 10, further comprising the steps:
providing, by the privileged daemon, a success status notification to the authorization plugin, when the privileged daemon locates the at least one applied rule for the one or restricted operations;
forwarding, by the authorization plugin, the success status notification to the authorization subsystem; and
authorizing, by the authorization subsystem, the one or more restricted operations to the running application.

12. The computer-implemented method of claim 8, wherein the one or more customized mechanism rights are created via the following steps:
obtaining a list of one or more regular rights;
copying the one or more regular rights to create one or more copied rights;
renaming the one or more copied rights to create one or more renamed rights, the one or more renamed rights preserve a function of the one or more regular rights; and
modifying the one or more regular rights by applying at least one modification to create the one or more customized mechanism rights;
wherein the at least one modification is selected from a group of modifications comprising: a class key configuration and a mechanisms key configuration.

13. The computer-implemented method of claim 8, wherein the operating system further comprises a service module and a message module;
wherein the service module is configured to expose a context menu for inputting one or more shell rules; and
wherein the message module is configured to display one or more messages for the at least one applied rule.

14. A system for controlling privileged operations on a client computer comprising:
at least one computing device comprising a processor and a memory;
an operating system defining a kernel space;
a kernel module comprising a kernel authorization subsystem for the kernel space and the kernel module being loadable in at least one computing device of the client computer, the kernel module, when executed by the at least one computing device, being configured to:
intercept one or more file operations;
manage, via the kernel authorization subsystem, authorization of the one or more file operations;
register a listener for the kernel authorization subsystem;
monitor the one or more file operations for a file access;
call, via the kernel authorization subsystem, the registered listener when the kernel authorization subsystem detects the file access;
identify the file access and then calling a privileged daemon;
receive a request, from a running application, for one or more restricted operations, wherein the one or more restricted operations are associated with one or more authorization rights that define one or more checks that must be performed in order to grant access to the one or more restricted operations; and
receive from the running application, a request to perform the one or more checks on the one or more authorization rights, wherein the one or more authorization rights comprise one or more customized mechanism rights created by the privileged daemon;

the privileged daemon being configured to:
  perform an authorization process with at least one root-user privilege;
  check a policy; and
  determine, based on the policy, whether at least one applied rule is applicable;
  if the at least one applied rule is applicable, initialize a launcher module with at least one parameter identifying a target application;
the launcher module being configured to launch the target application with the at least one root-user privilege; and
an authorization subsystem being configured to
  receive a request from a running application for one or more restricted operations; wherein the one or more restricted operations are associated with one or more authorization rights that define one or more checks that must be performed in order to grant access to the one or more restricted operations; and
  receive a call from the running application to perform the one or more checks on the one or more authorization rights, the one or more authorization rights comprise one or more customized mechanism rights created by the privileged daemon.

15. The system of claim 14, wherein when the kernel module identifies the file access, the registered listener obtains a file name of the file access and provides the file name to the privileged daemon, such that the privileged daemon checks the policy with the file name to determine whether the at least one applied rule is applicable.

16. The system of claim 14, wherein the kernel module is further configured to:
  receive, from the running application, a request for the one or more customized mechanism rights;
  invoke an authorization plugin; and
  call the privileged daemon to lookup the policy to determine whether at least one applied rule, which allows the one or more restricted operations, should be applied.

17. The system of claim 16, wherein:
the privileged daemon is further configured to:
  locate the at least one applied rule for the one or more restricted operations; and
  in response to locating the at least one applied rule, provide a success status notification to the authorization plugin;
the authorization plugin is configured to forward the success status notification to the authorization subsystem; and
the authorization subsystem configured to authorize the one or more restricted operations to the running application.

18. The system of claim 14, wherein the one or more customized mechanism rights are created via the following steps:
  obtaining a list of one or more regular rights;
  copying the one or more regular rights to create one or more copied rights;
  renaming the one or more copied rights to create one or more renamed rights, the one or more renamed rights preserve a function of the one or more regular rights; and
  modifying the one or more regular rights by applying at least one modification to create the one or more customized mechanism rights;
  wherein the at least one modification is selected from a group of modifications comprising: a class key configuration and a mechanisms key configuration.

19. The system of claim 14, wherein the operating system further comprises
  a service module and a message module;
  wherein the service module is configured to expose a context menu for inputting one or more shell rules; and
  wherein the message module is configured to display one or more messages for the at least one applied rule.

20. The system of claim 14, wherein the operating system comprises the authorization subsystem.

* * * * *